(12) United States Patent
Walton et al.

(10) Patent No.: US 7,724,985 B2
(45) Date of Patent: May 25, 2010

(54) DEVICE STORING VECTOR IMAGE WITH EMBEDDED IMAGE STYLE IDENTIFIER, AND METHODS AND UTILITIES FOR FORMATTING A DEVICE IMAGE WITH IMAGE STYLE ATTRIBUTES

(75) Inventors: Andrew Christopher Walton, Rocklin, CA (US); Bryan J. Jacquot, Windsor, CO (US); Christopher William Brown, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1245 days.

(21) Appl. No.: 11/261,199

(22) Filed: Oct. 27, 2005

(65) Prior Publication Data

US 2007/0098211 A1    May 3, 2007

(51) Int. Cl.
*G06T 1/00* (2006.01)
(52) U.S. Cl. .................................. 382/305; 345/581
(58) Field of Classification Search ........................ None
See application file for complete search history.

(56) References Cited

U.S. PATENT DOCUMENTS

| | | | |
|---|---|---|---|
| 2002/0109729 A1* | 8/2002 | Dutta | 345/790 |
| 2003/0090459 A1 | 5/2003 | Lapstun et al. | |
| 2003/0154266 A1 | 8/2003 | Bobick et al. | |
| 2004/0030778 A1 | 2/2004 | Kronenberg et al. | |
| 2004/0083138 A1 | 4/2004 | Silverbrook et al. | |
| 2004/0093559 A1 | 5/2004 | Amaru et al. | |
| 2004/0104928 A1 | 6/2004 | Morioka | |
| 2004/0113937 A1* | 6/2004 | Sawdey et al. | 345/738 |
| 2004/0194057 A1* | 9/2004 | Schulte et al. | 717/114 |
| 2005/0193368 A1* | 9/2005 | Becker et al. | 717/106 |
| 2006/0140513 A1* | 6/2006 | Tran Xuan et al. | 382/305 |

FOREIGN PATENT DOCUMENTS

| | | |
|---|---|---|
| EP | 0444251 A1 | 9/1991 |
| JP | 2001075756 A | 3/2001 |
| JP | 2001086078 A | 3/2001 |
| JP | 2001356890 A | 12/2001 |
| JP | 2003242056 A | 8/2003 |
| JP | 2003330915 A | 11/2003 |
| JP | 2005527057 | 3/2004 |
| WO | 94/11804 A1 | 5/1994 |
| WO | 2004/044789 A2 | 5/2004 |

\* cited by examiner

*Primary Examiner*—Jon Chang

(57) ABSTRACT

In one embodiment, a computer-implemented method retrieves a vector image from a device that is a target of an image request. The vector image illustrates at least a portion of the device. A first image style identifier, associated with a first set of style attributes for the vector image, is located within the vector image. A search is conducted for a second set of style attributes for the vector image, the second set of style attributes being stored apart from the vector image, and the second set of style attributes being given a higher priority than the first set of style attributes for the vector image. If the second set of style attributes is found, the vector image is caused to be formatted using at least the second set of style attributes. Other embodiments are also disclosed.

19 Claims, 7 Drawing Sheets

DEVICE STORING VECTOR IMAGE WITH EMBEDDED IMAGE STYLE IDENTIFIER, AND METHODS AND UTILITIES FOR FORMATTING A DEVICE IMAGE WITH IMAGE STYLE ATTRIBUTES

BACKGROUND

The management of a device is typically aided by providing its user with a means to graphically visualize the device. In some cases, one or more images of a device and its components may be included within paper or electronic documentation (e.g., a user manual). In other cases, a device may be provided with stickers showing one or more views of the device's interior components.

In still other cases, images of a device may be incorporated into a management tool for the device. For example, a print driver may display an image of the printer to which it corresponds, or a server management tool may display various images associated with the server components of which the management tool is aware or can manage (e.g., the server's memory modules, interfaces, or storage disks).

Many devices for which graphical images are needed are subject to change. That is, the devices may be upgradeable such that additional components (e.g., memory modules, interfaces, or storage disks) may be inserted into or attached to the device. Thus, an issue facing the image creator is whether to draw an image of each configuration of the device or draw a single "exemplary" image in which the device is depicted in one particular "default" configuration.

A device may also be subject to change over its lifecycle. That is, the styling of the device's exterior, the suppliers of its internal components, its "default" configuration, and even its available features can change over its lifecycle. Thus, any images pertaining to the first generation of the device may not accurately depict later generations of the device.

As one can appreciate, the creation and maintenance of graphical images for a device can present a significant burden for both device manufacturers and third-party device supporters (e.g., management tool developers).

SUMMARY OF THE INVENTION

In one embodiment, an image formatting utility comprises code to, in response to receiving an image request, 1) retrieve a vector image from a device that is a target of the image request, the vector image illustrating at least a portion of the device; 2) locate a first image style identifier within the vector image, the first image style identifier being associated with a first set of style attributes for the vector image; 3) search for a second set of style attributes for the vector image, the second set of style attributes being stored apart from the vector image, and the second set of style attributes being given a higher priority than the first set of style attributes for the vector image; and 4) if the second set of style attributes is found, cause the vector image to be formatted using at least the second set of style attributes.

In another embodiment, an image formatting utility comprises code to, in response to receiving an image request, 1) retrieve a vector image from a device that is a target of the image request, the vector image illustrating at least a portion of the device; 2) locate a set of style attributes for the vector image, the set of style attributes being stored apart from the vector image; and 3) link the set of style attributes with a first image style identifier embedded in the vector image.

In another embodiment, a device comprises 1) a non-volatile memory in which a vector image illustrating at least a portion of the device is stored, and 2) an interface to provide access to the vector image. The vector image comprises an embedded image style identifier that identifies a set of style attributes that are stored apart from the vector image.

In yet another embodiment, a device comprises 1) a non-volatile memory that stores a vector image illustrating at least a portion of the device, and 2) an interface to provide access to the vector image. The vector image declares, but does not fully specify, a function call that is triggered in response to an event associated with display of the vector image.

Other embodiments are also disclosed.

BRIEF DESCRIPTION OF THE DRAWINGS

Illustrative embodiments of the invention are illustrated in the drawings, in which.

DETAILED DESCRIPTION

One development that has eased the burden of creating and maintaining graphical images for a device is the electronic storage of a device's images within the device itself. For example, different images pertaining to different views and/or components of a device may be saved as Scalable Vector Graphics (SVG) images, or other easy-to-manipulate image types, and stored within a non-volatile memory of the device (preferably, but not always, in the device's firmware). Thus, a management tool for the device no longer needs to provide its own set of images for the device. Rather, the management tool need only be provided with abilities to 1) query the device to retrieve an image of the device, and 2) format the image to reflect the current state of the device. In this manner, the developer of the management tool need not be concerned with how the device looks, and can instead focus on how the device functions and is managed.

Figure 1:
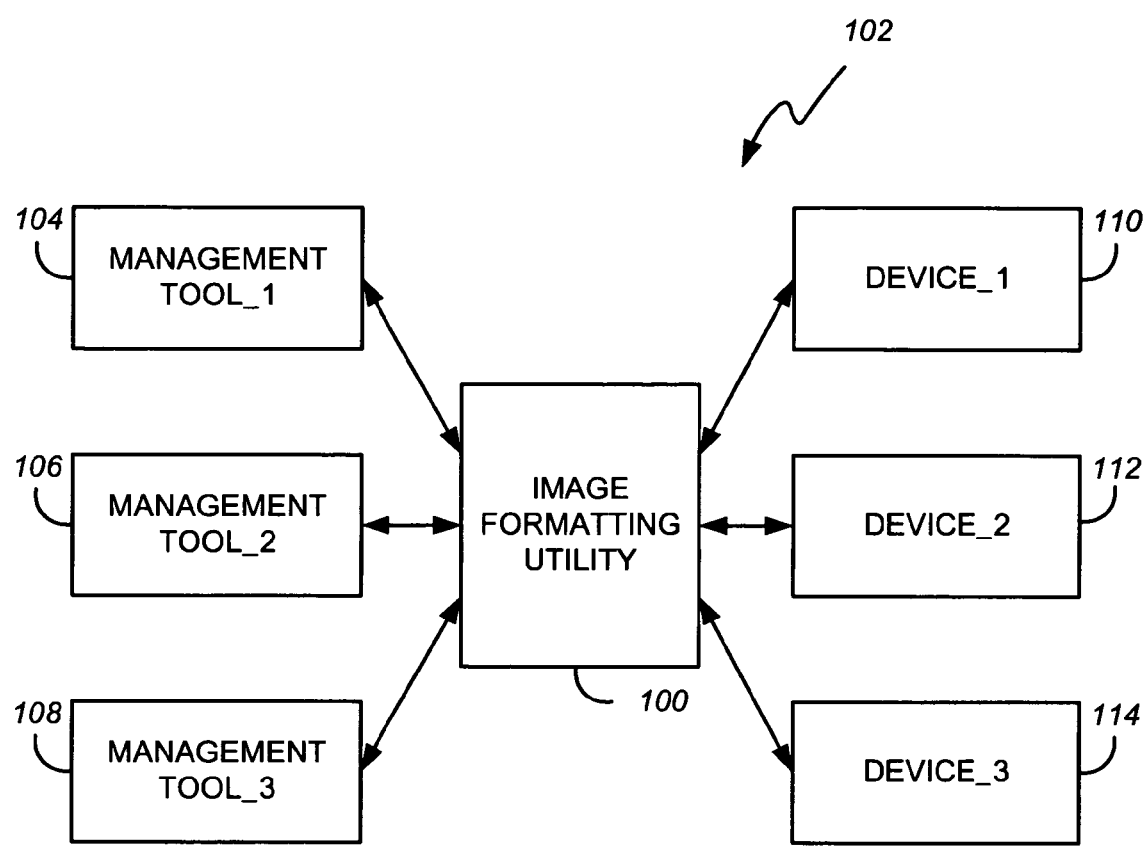
FIG. 1 illustrates an exemplary system in which an image formatting utility may be used.

To further ease a management tool developer's burden of having to work with device images, an image formatting utility 100 (FIG. 1), and system 102 incorporating same, are disclosed herein. By way of example, the "utility" 100 may take the form of an application or browser plug-in that is embodied in computer-readable code stored on one or more computer-readable media. The computer-readable media may include, for example, any number or mixture of fixed or removable media (such as one or more fixed disks, random access memories (RAMs), read-only memories (ROMs), or compact discs), at either a single location or distributed over a network.

Before describing embodiments of the image formatting utility 100 in detail, an exemplary system 102 (FIG. 1) in which the image formatting utility 100 may be used will be described.

The system 102 comprises one or more device management tools 104, 106, 108 for generating image requests, and one or more devices 110, 112, 114 that may be targets of the image requests. Each of the devices 110-114 is provided with a non-volatile memory in which one or more images (i.e., an image set) illustrating at least a portion of the device is stored. Assuming that the management tools 104-108 and devices 110-114 comprise interfaces that are compatible with those of the image formatting utility 100, the utility 100 may 1) receive plural image requests from any one or more of the management tools 104-108, and 2) in responding to the plural image requests, format images retrieved from a plurality of the devices 110-114 and return the formatted images to the requesting ones of the management tools 104-108. Of note, the management tools 104-108 and devices 110-114 of the system 102 have no direct link to nor dependence on each other. Thus, one or the other can easily be modified or appended without affecting the other. Furthermore, the image(s) stored within the devices 110-114 can be updated without any need to worry about how the updated images will be drawn by the utility 100 or the management tools 104-108.

The management tools 104-108 of the system 102 may take various forms, including, for example, those of a: print driver, configuration manager, licensing manager, server manager, system manager, or network manager. In one embodiment of the system 102, one or more of the device management tools 104-108 may present a user interface (e.g., a graphical user interface (GUI)) through a web browser.

The devices 110-114 of the system 102 may also take various forms, including, for example, those of a: server, computer system, printer, or network. Further, the devices in which images are stored may be parts of other devices. For example, images may be stored in a memory of a computer motherboard, while additional images may be stored in a configurable video or networking card that has been inserted into a slot of the motherboard.

In one embodiment, the image or images (i.e., image set) stored within a device comprise SVG images. SVG is a language for describing two-dimensional graphics and graphical applications in extensible markup language (XML). SVG specifications are published by the World Wide Web Consortium (W3C®). SVG images are particularly suited to being stored in a device as a result of their small storage requirements, scalable size, and configurability. Alternately, a device's image set may comprise other types of easy-to-manipulate images, such as other vector-based images (e.g., postscript images).

Each device 110-114 may store its image set in a non-volatile memory. The images in each image set illustrate at least a portion of the device in which they are stored, and in some cases may illustrate different portions or views of the device. For purposes which will become clear later in this description, one or more of the stored images may be vector images (see vector image 300, FIG. 3). Each of the vector images may comprise a plurality of vectors and one or more embedded image style identifiers 302. Each of the image style identifiers identifies a set of style attributes that are stored internally or externally to the vector image. In some cases, an image style identifier may be associated with a set of style instructions for part or all of the image. In other cases, an image style identifier may be a placeholder element (e.g., a name of a file that does not exist absent some other process defining or providing its content).

In a simple embodiment, each of the devices 110-114 need only have an ability to fetch and return its stored image set (possibly only one image). However, in other embodiments, a device interface may have an ability to fetch a particular image (e.g., via address, number or type). A device interface may also return component presence and status information for the device, although it need not.

Although the exemplary system 102 illustrates the utility 100 being stored and executed apart from any management tool 104-108 or device 110-114, the utility 100 could alternately be stored and executed locally to a particular management tool or device (e.g., within the device).

Having described exemplary contexts in which the utility 100 may be used, embodiments of the utility 100 will now be described in greater detail.

Figure 2:
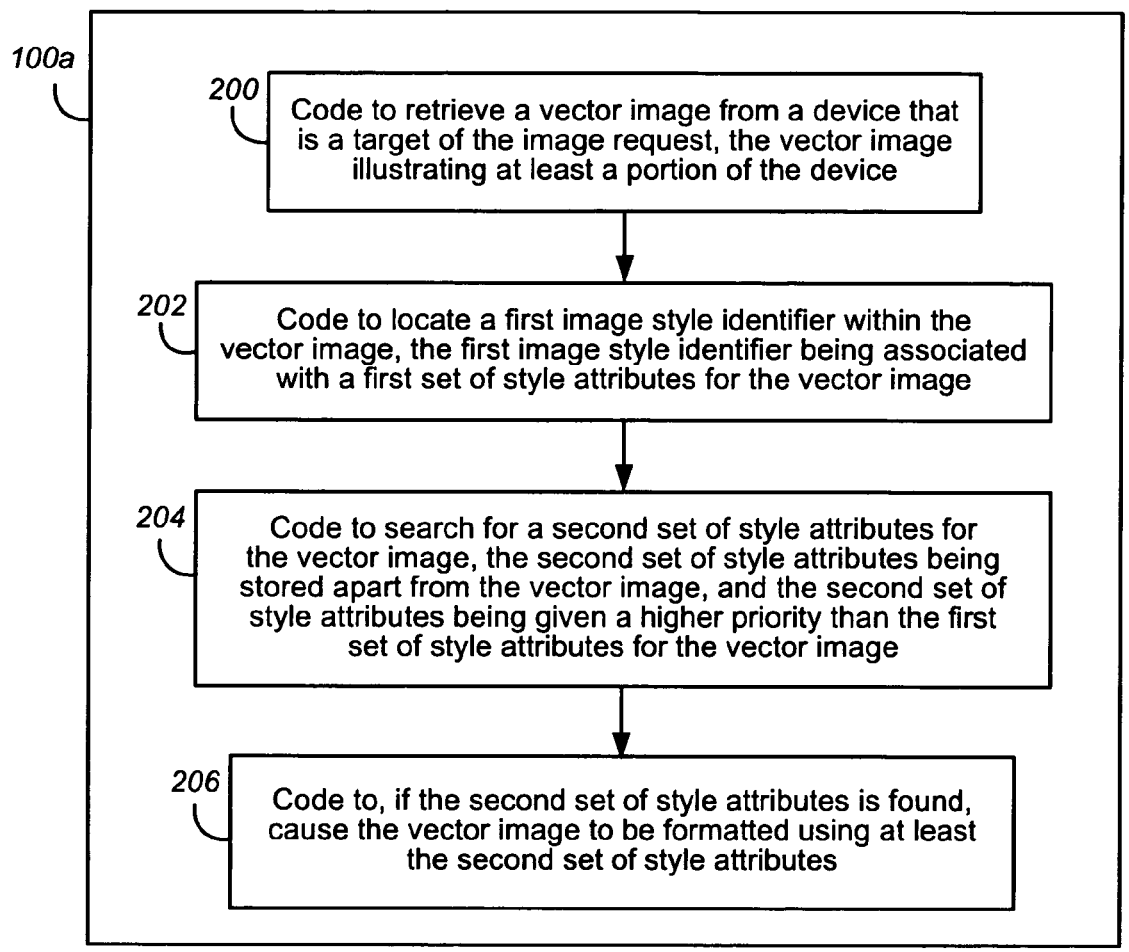
FIG. 2 illustrates a first exemplary embodiment of the image formatting utility shown in FIG. 1.

FIG. 2 illustrates a first embodiment 100a of the utility 100. The utility 100a comprises code 200 to, in response to receiving an image request, retrieve a vector image from a device that is a target of the image request. The utility 100a also comprises code 202 to locate an image style identifier within the vector image. The image style identifier is associated with a first set of style attributes for the vector image and, in one embodiment, the image style identifier identifies a set of style attributes that are stored in a location external to the vector image (e.g., the image style identifier could be a name of a file containing the style attributes). Alternately, the image style identifier may point to a set of style attributes that are stored internal to the vector image (i.e., in the same file that contains the vector image).

Figure 3:
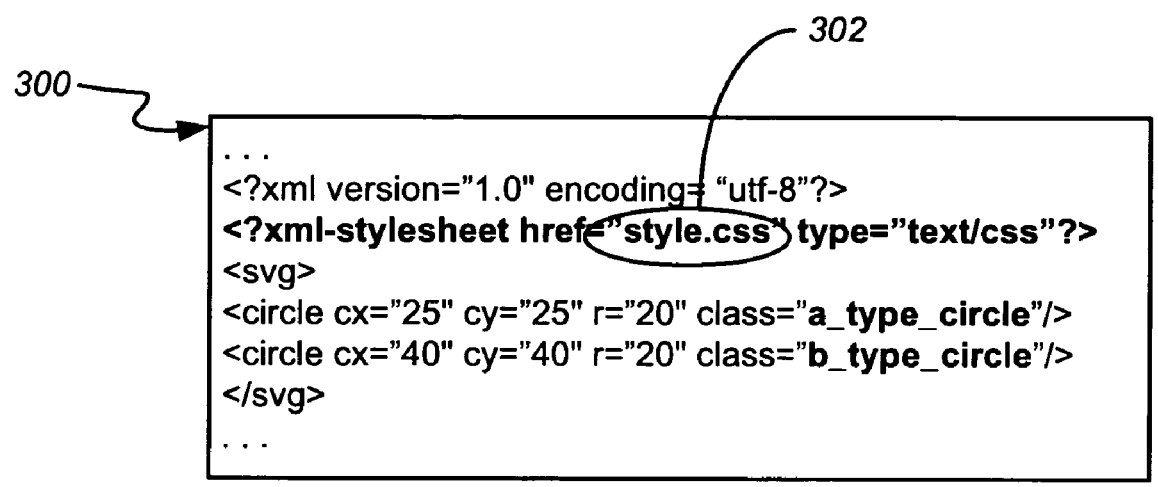
FIG. 3 illustrates an exemplary vector image having an embedded image style identifier.

A portion of an exemplary vector image 300 having an embedded image style identifier 302 (i.e., "style.css") is shown in FIG. 3. By way of example, the vector image 300 is shown to be an SVG image, and the image style identifier 302 is shown to be a name of a cascading style sheet (CSS). For the vector image 300, the cascading style sheet referenced by the image style identifier needs to provide a style for the image components "a_type_circle" and "b_type_circle".

By way of example, the style attributes that are associated with an image style identifier may be colors, font styles, alignments and other features of part or all of a vector image. If a style attribute is specified for an image part, the image part may be a component, a caption, a table or some other part of an image.

The utility 100a (FIG. 2) also comprises code 204 to search for a second set of style attributes for the vector image. The second set of style attributes is stored apart from the vector image and is given a higher priority than the set of style attributes referenced by the image style identifier that is embedded within the vector image. If the second set of style attributes is found, code 206 causes the vector image to be formatted using at least the second set of style attributes. In this manner, a default set of style attributes for the vector image may be replaced or supplemented with style attributes that are provided by, for example, a particular management application.

The code 204 may be configured to search for the second set of style attributes in a number of ways. For example, the code 204 may determine whether a set of style attributes was received with an image request. Alternately, the code 204 may dispatch a query to the management tool that initiated an image request. Other locations in which the code 204 may search for the second set of style attributes include: 1) the device itself (e.g., to determine whether a supplemental set of style attributes was stored along with the vector image due to, for example, a last minute image style change before the device was released; or to determine if an operating system of the device provides alternate style attributes); 2) a device management tool (including, for example, style preferences of an operating system that supports the device management tool); 3) an image display system (e.g., if a particular display system is only capable of displaying certain styles (fonts), or if a display system is otherwise associated with its own style preferences); and 4) user input, such as user input to the utility 100a or to a device management tool.

In some cases, the code 204 may implement a search order priority. That is, the code 204 may cause a first location to be searched for the second set of style attributes and, upon a failure to locate the second set of style attributes at the first location, the code 204 may cause a second location to be searched for the style attributes. By way of example, any or all of the locations enumerated in the preceding paragraph could be included in a search order priority.

A determination as to whether a second set of style attributes has a "higher priority" than a set of style attributes referenced from within the vector image may be made, for example, by comparing priority information associated with each set of style attributes. Or, more simply, the higher priority of a second set of style attributes may be inferred by the mere existence of the second set of style attributes.

The code 206 that causes a vector image to be formatted may be configured to format the vector image in a variety of ways. One way to format the vector image is to replace the image's existing image style identifier with the image style identifier associated with the second set of style attributes for the vector image. Alternately, the first set of style attributes may be replaced with the second set of style attributes. As another alternative, and if the second set of style attributes is associated with the same image style identifier that is already embedded within the vector image, the vector image may simply be re-linked to the second set of style attributes, of the second set of style attributes may be copied into the vector image. On the other hand, if the vector image is to be rendered (i.e., converted to a raster-based format), the code 206 may simply render the vector image in accord with the second set of style attributes, without otherwise linking the second set of style attributes with, or copying them into, the un-rendered vector image.

The code 206 may also format a vector image using a combination of both the first and second sets of style attributes. For example, if a style targeted by one of the first set of style attributes is also targeted by one of the second set of style attributes, the one of the second set of style attributes may be substituted for the one of the first set of style attributes. However, if the second set of style attributes does not include a style instruction corresponding to an instruction in the first, then the instruction in the first set is used.

Figure 4:
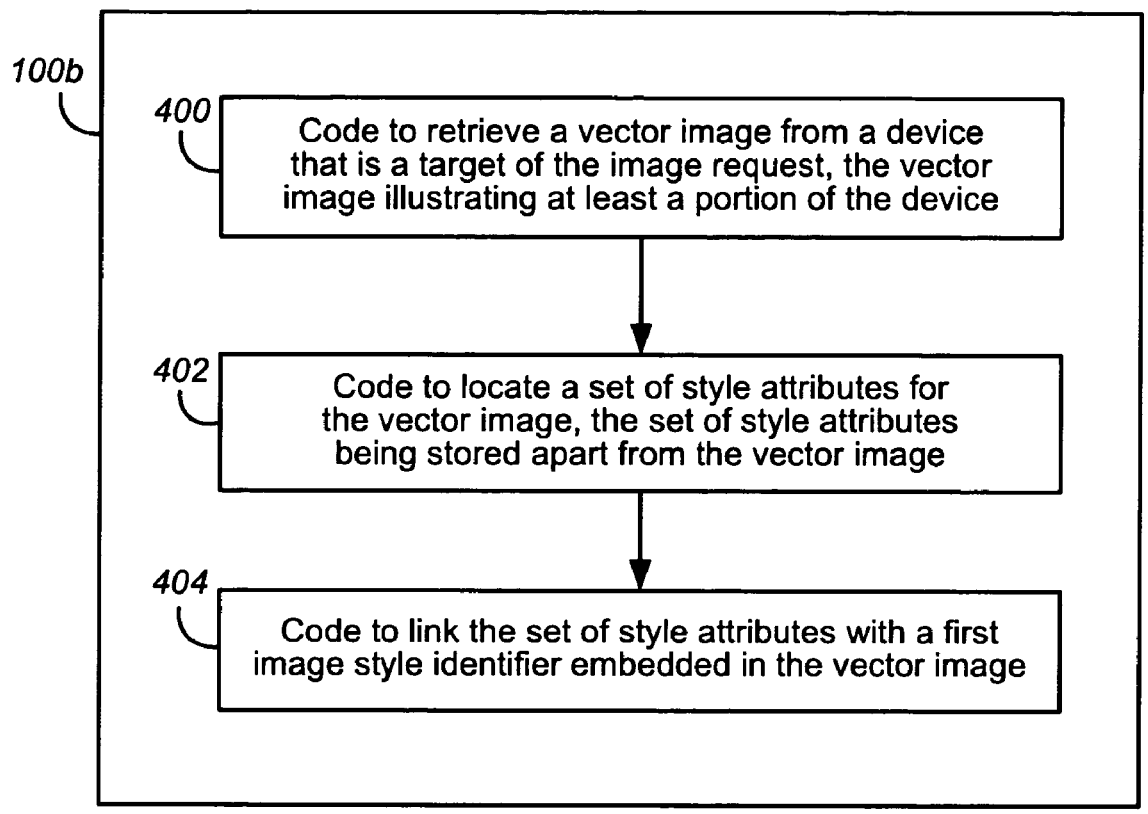
FIG. 4 illustrates a second exemplary embodiment of the image formatting utility shown in FIG. 1.

FIG. 4 illustrates a second embodiment 100b of the utility 100. The utility 100b comprises code 400 to, in response to receiving an image request, retrieve a vector image from a device that is a target of the image request. Code 402 then locates a set of style attributes for the vector image, the set of style attributes being stored apart from the vector image. If located, code 404 links the set of style attributes with an image style identifier that is embedded in the vector image. In this manner, a vector image may be provided with image style identifiers, but no default style attributes; and a set of style attributes may then be linked to the image upon retrieval of the image from its device.

Similarly to the code 204, the code 402 may be configured to locate the set of style attributes in a number of ways. For example, the code 402 may determine whether a set of style attributes was received with an image request. Alternatively, the code 402 may dispatch a query to the management tool that initiated an image request. Other locations in which the code 402 may search for a set of style attributes include: the device itself; a device management tool; an image display system; and user input.

In some cases, the code 402 may implement a search order priority. That is, the code 402 may cause a first location to be searched for a set of style attributes and, upon a failure to locate a set of style attributes at the first location, the code 402 may cause a second location to be searched for the style attributes. By way of example, any or all of the locations enumerated in the preceding paragraph could be included in a search order priority.

The code 404 that links the set of style attributes with the image style identifier embedded in the vector image may be configured to perform the linking in a variety of ways. For example, in one embodiment, the code 404 may locate an image style identifier embedded in the vector image, and then replace the image style identifier with an image style identifier corresponding to the located style attributes. In another embodiment, the code 404 may locate an image style identifier embedded in the vector image, and then rename a file containing a set of style attributes to correspond to the embedded image style identifier.

As previously indicated, the code 200-206 or 400-404 may be included within a utility 100a or 100b that stands apart from other management tools 104-108 and devices 110-114. Alternately, instances of the code 200-206 or 400-404 may be provided as part of the management tools 104-108, or may be stored and executed by the devices 110-114.

Although the utilities 100a and 100b have been described in the context of a vector image containing only a single image style identifier, it is noted that some vector images may have numerous embedded image style identifiers. The utilities 100a and 100b may handle all of these image style identifiers in the same way, and in parallel.

By means of the vector images 300 and utilities 100a, 100b disclosed herein, different management tools 104-108 may format the same device image 300 in accord with different style attributes. Similarly, a single management tool 104 may format different device images in accord with the same style attributes. Also, if an image 300 is provided with (or associated with) default style attributes, the utility 100a may replace or supplement some, but not all, of the image's style attributes. The methods and apparatus disclosed herein also provide for easier update of either an image's or management tool's style attributes, without requiring the update of either the image or the management tool.

Figure 5:
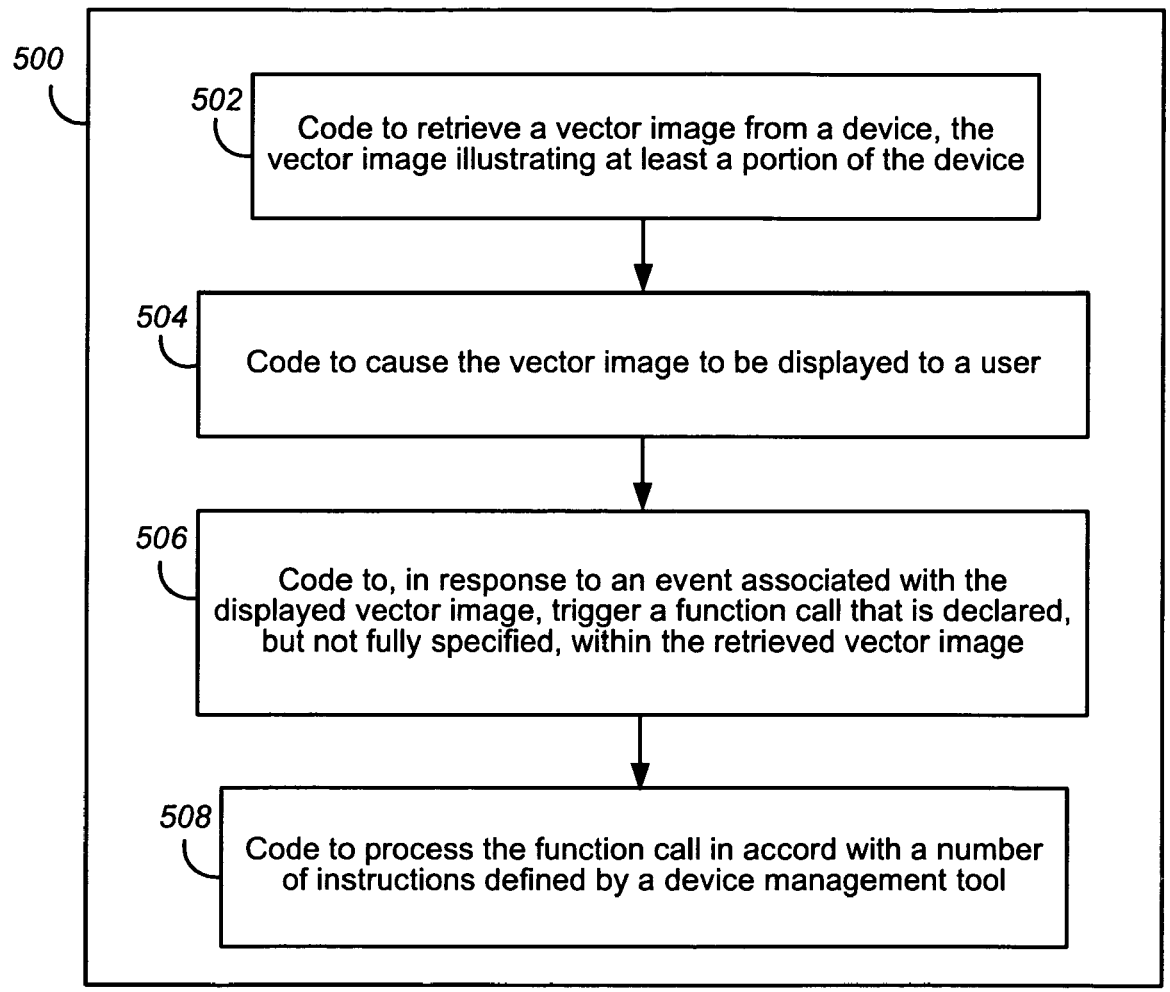
FIG. 5 illustrates exemplary code for processing a function call that is declared, but not fully specified, within a vector image stored in a device.

FIG. 5 illustrates additional or alternate code 500 that may be incorporated into, or distributed amongst, one or more of: the utility 100, the management tool 104, 106 or 108, or the device 110, 112 or 114. The code 500 comprises code 502 to retrieve a vector image from a device (the vector image illustrating at least a portion of the device), and code 504 to cause the vector image to be displayed to a user. In some cases, the code 504 may simply pass the retrieved vector image to another computer system or process for display. In other cases, the code 504 may render and/or directly cause the retrieved vector image to be displayed.

The code 500 further comprises code 506 to, in response to an event associated with the displayed vector image, trigger a function call that is declared, but not fully specified, within the retrieved vector image. Code 508 then processes the function call in accord with a number of instructions that are defined by a device management tool.

Using the code 500, a vector image that is stored within a device (and that illustrates the device) may be provided with an interface for implementing functions that are specified by a device management tool. In this manner, a vector image can be provided with a degree of customization or interactivity that can be specified subsequent to creation of the vector image. The code 500 also enables different management tools to process the function call in different ways. For example, a call to display more information could be processed by a first management tool to affect the display of a first set of additional information. The same call could be processed by a second management tool to affect the display of a second set of information. A third management tool might ignore the call altogether.

The event that triggers the function call may take various forms. In some embodiments, the event may be a user's interaction with a displayed vector image. For example, a mouse event such as a mouse-click or mouse-over may trigger the function call. Alternately, the event that triggers the function call may be any event that is initiated by a user input device (e.g., a keyboard, mouse, touchpad, digitizing pad or speech recognition device), such as a button-down, button-up, area selection, command entry or keystroke event. In other cases, the event may be a software or machine-initiated event, such as a page refresh event, a page load event, or some other event.

The function call may also take various forms. However, in one embodiment, the function call takes the form of a Java-Script method call.

For purposes of this description, a "function call" is intended to include programming conventions that are not labeled as "calls", but which function equivalently to calls. For example, a "forward declaration", which is common to many programming languages, would be considered equivalent to a "call" for purposes of this description. The writing of function parameters to a shared memory, or the setting of a flag or pointer, may also be considered equivalent to a "function call".

The number of instructions that are defined by a device management tool, and processed by the code 508, may provide various functions. In one embodiment, the instructions may cause additional information to be displayed (e.g., additional textual information, such as status information, a table or a chart; or additional graphic information, such as a plan, zoomed or exploded view of a device component). The additional information may be displayed in the same window as the vector image, or in a new window, a dialog box or another display element.

In another embodiment, the instructions may cause one or more vectors, such as the vectors defining a particular component, to be emphasized when displayed (e.g., by changing their color, line weight, transparency, fill pattern or other characteristics).

If a set of instructions provided by a device management tool causes additional information to be displayed, the additional information may be obtained, for example, from a device management tool or device. In some cases, the additional information may be specified as part of a vector image (but in a form that is not normally displayed).

Figure 6:
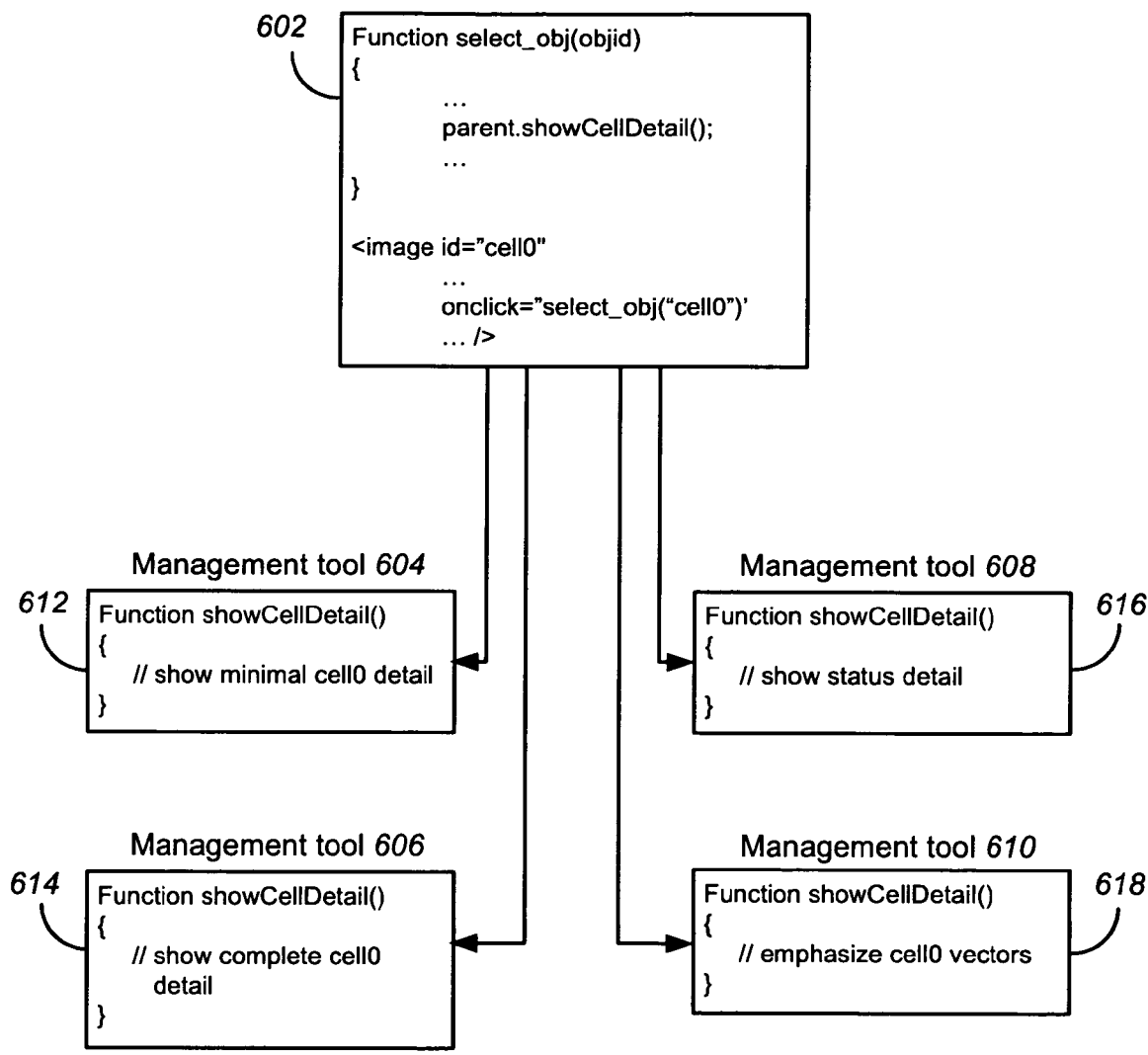
FIG. 6 illustrates exemplary pseudo-code of a vector image, as well as various exemplary instruction sets that different management tools may provide for processing the function call of the vector image.

FIG. 6 illustrates exemplary pseudo-code 602 of a vector image, as well as various exemplary instruction sets 604, 606, 608, 610 that different management tools may provide for processing a function call of the vector image.

Figure 7:
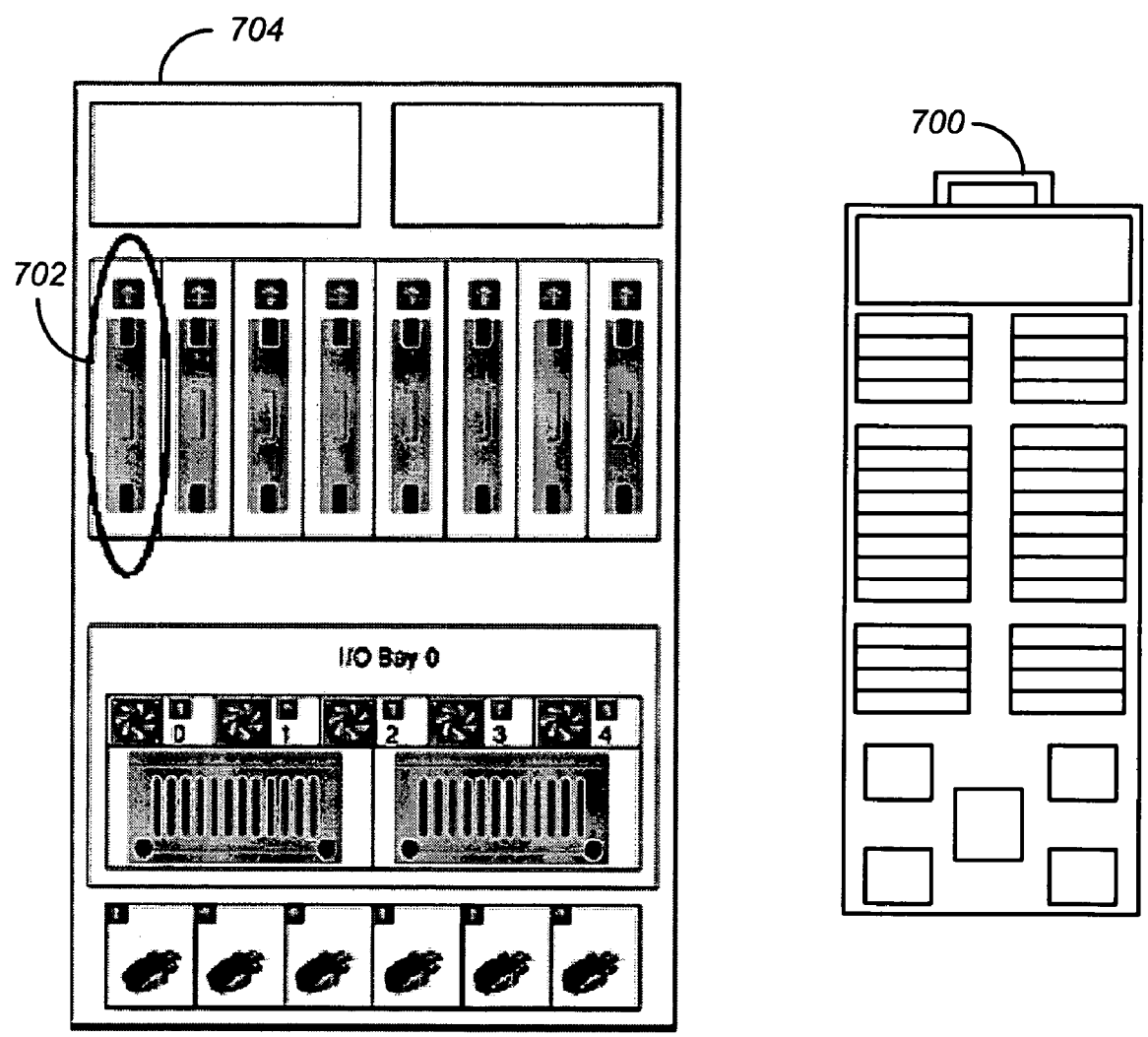
FIG. 7 illustrates the exemplary display of a vector image with additional information, the additional information being provided as a result of processing a function call that is declared, but not fully specified, within the vector image.

By way of example, the pseudo-code 602 comprises a set of vectors for drawing a "cell0". The pseudo-code 602 also indicates that, in response to an "onclick" event, the internal function "select_obj" is called. The internal "select_obj" function, in turn, calls an external "showCellDetail( )" function. In use, a plurality of device management tools 604, 606, 608, 610 may cause the pseudo-code 602 to be executed, and thus cause the vector image defined by the pseudo-code 602 to be displayed. However, upon an "onclick" event that triggers the function call "showCellDetail( )", each of the device management tools 604, 606, 608, 610 may provide a different set of instructions 612, 614, 616, 618 for implementing the function. For example, the tool 604 may show additional but minimal cell detail for cell0; the tool 606 may show additional and complete cell detail for cell0; the tool 608 may show status detail for cell0; and the tool 610 may cause certain vectors of cell0 to be emphasized. FIG. 7 illustrates the exemplary additional cell information 700 that tool 606 may display when a user clicks on cell0 702 of the server image 704.

What is claimed is:

1. A computer usable storage medium having stored thereon instructions that when executed cause a computer system to perform a method for formatting an image, said method comprising:
   in response to receiving an image request, retrieving a vector image from a device that is a target of said image request, said vector image illustrating at least a portion of device;
   locating at said device a first image style identifier within said vector image, said first image style identifier being associated with a first set of style attributes for said vector image;
   searching for a second set of style attributes for said vector image, said second set of style attributes being stored apart from said vector image, and said second set of style attributes being given a higher priority than said first set of style attributes for said vector image; and
   if the second set of style attributes is found, causing said vector image to be formatted using at least said second set of style attributes.

2. The computer usable storage medium of claim 1, wherein the causing of said vector image to be formatted using at least said second set of style attributes further comprises:
   replacing said first image style identifier with a second image style identifier, said second image style identifier being associated with said second set of style attributes for said vector image.

3. The computer usable storage medium of claim 2, wherein at least one of said first and second sets of style attributes is a cascading style sheet (CSS).

4. The computer usable storage medium of claim 1, wherein the causing of said vector image to be formatted using at least said second set of style attributes further comprises:
   replacing said first set of style attributes with said second set of style attributes.

5. The computer usable storage medium of claim 1, wherein the causing of said vector image to be formatted using at least said second set of style attributes further comprises:
   if a style targeted by one of said first set of style attributes is also targeted by one of said second set of style attributes, substituting said one of said second set of style attributes for said one of said first set of style attributes.

6. The computer usable storage medium of claim 1, wherein said first image style identifier identifies a location of said first set of style attributes external to said vector image.

7. The computer usable storage medium of claim 1, wherein the method further comprises:
   identifying a location of said first set of style attributes internal to said vector image based on said first image style identifier.

8. The computer usable storage medium of claim 1, wherein the method further comprises:
obtaining said second set of style attributes from a device management tool.

9. The computer usable storage medium of claim 1, wherein the searching for said second set of style attributes further comprises:
implementing a search order priority, said search order priority causing a first location to be searched for said second set of style attributes and, upon a failure to locate said second set of style attributes at said first location, causing a second location to be searched for said second set of style attributes.

10. The computer usable storage medium of claim 9, wherein locations included in said search order priority are selected from locations are selected from a group consisting of said device, a device management tool, an image display system, and user input.

11. A computer usable storage medium having stored thereon instructions that when executed cause a computer system to perform a method for formatting an image, said method comprising:
in response to receiving an image request from a device management tool, retrieving a vector image from a device that is a target of said image request, said vector image illustrating at least a portion of said device;
locating at said device a set of style attributes for said vector image, said set of style attributes being stored apart from said vector image; and
linking said set of style attributes with a first image style identifier embedded in said vector image.

12. The computer usable storage medium of claim 11, wherein the linking of said set of style attributes with said first image style identifier embedded in said vector image further comprises:
locating a second image style identifier embedded in said vector image; and
replacing said second image style identifier with said first image style identifier.

13. The computer usable storage medium of claim 11, wherein the linking of said set of style attributes with said first image style identifier embedded in said vector image further comprises:
locating said first image style identifier within said vector image; and
renaming a file containing said set of style attributes to correspond to said first image style identifier.

14. The computer usable storage medium of claim 11, wherein the method further comprises:
obtaining said set of style attributes from said device management tool.

15. The computer usable storage medium of claim 11, wherein said locating of said set of style attributes further comprises: implementing a search order priority, said search order priority causing a first location to be searched for said set of style attributes and, upon a failure to locate said set of style attributes at said first location, causing a second location to be searched for said set of style attributes.

16. The computer usable storage medium of claim 15, wherein locations included in said search order priority are selected from a group consisting of said device, a device management tool, an image display system, and user input.

17. A device, comprising: a non-volatile memory in which a vector image illustrating at least a portion of the device is stored, the vector image comprising an embedded image style identifier that identifies a set of style attributes stored apart from the vector image; and an interface to provide access to the vector image.

18. A device, comprising: a non-volatile memory storing a vector image illustrating at least a portion of the device, the vector image declaring, but not fully specifying, a function call that is triggered in response to an event associated with display of the vector image, wherein the vector image includes an image style identifier that is associated with a set of style attributes that is stored separately from the vector image; and an interface to provide access to the vector image.

19. The device of claim 18, wherein the event is specified within the vector image as a type of user interaction with a display of the vector image.

* * * * *